Figure 1:
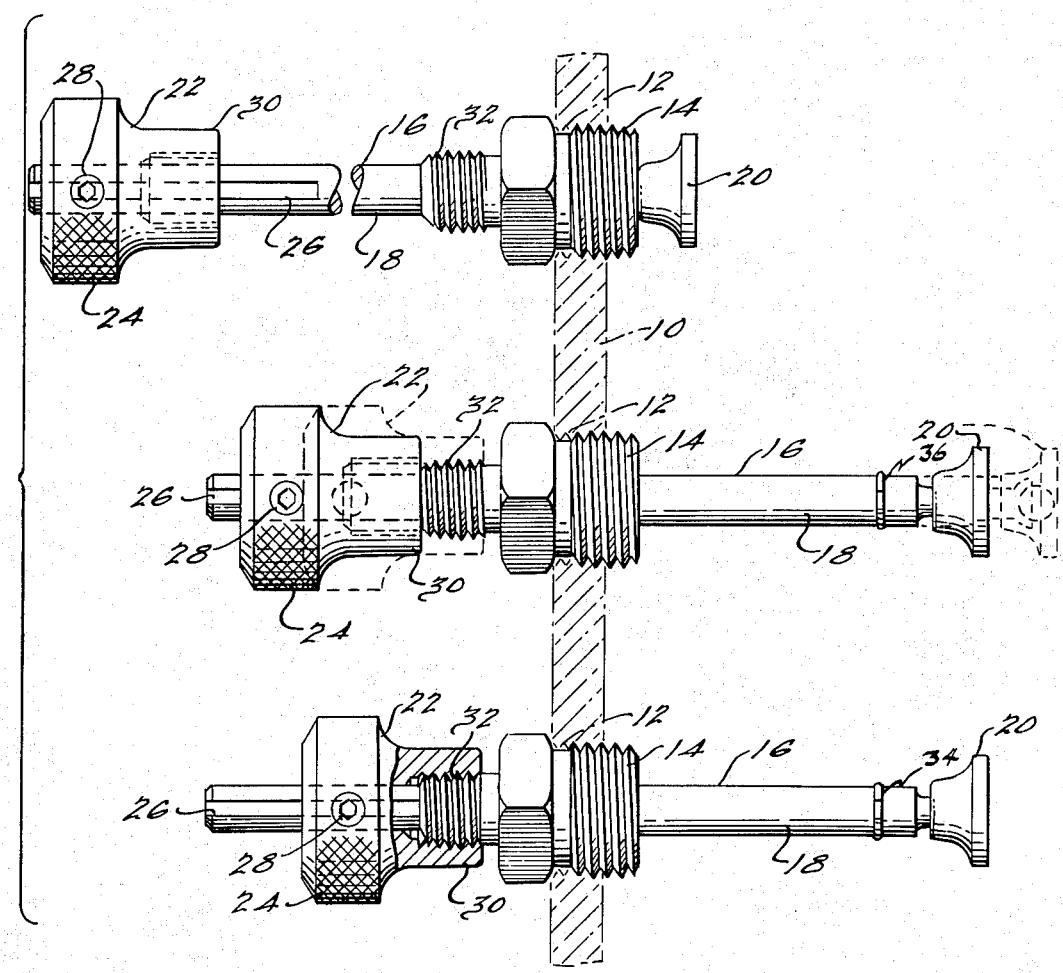
Figure 2:
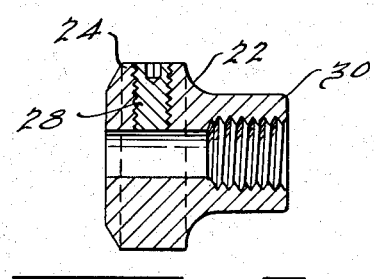

May 22, 1956

H. H. MERRIMAN 2,746,317

PRESSURE UNITS

Filed June 9, 1952

INVENTOR.
Henry H. Merriman
BY
ATTORNEY.

United States Patent Office 2,746,317
Patented May 22, 1956

2,746,317
PRESSURE UNITS
Henry H. Merriman, Jackson, Mich.

Application June 9, 1952, Serial No. 292,460

1 Claim. (Cl. 74—503)

The present invention relates to improvements in clamps and pressure exerting units, being especially adapted for use upon jigs and fixtures employed in manufacturing.

In the loading and unloading of parts to be assembled or processed in jigs and fixtures in the manufacture of various types of goods, the clamping and pressure exerting devices usually involve some sort of foot or pressure pad which is moved into engagement with the work and then thereafter it becomes desirable to move the foot or pad completely away from the work. Often times a great number of such devices must be used and it becomes of importance to provide a device of such design that it may be inexpensively manufactured and installed in the jig or fixture and efficiently operated by unskilled persons.

According to the present invention, my improved clamping or pressure unit takes the form of a rod having a pressure foot at one end and a longitudinally adjustable combination handle and nut on the other end. A bushing is assembled upon the rod between its ends, with one portion of the bushing being threaded to receive the nut and to advance the foot with the mechanical advantage of a screw upon longitudinal movement of the rod followed by relative rotation between the handle and the bushing.

Thus, one object of the invention is to provide an improved pressure unit in which a longitudinally slidable thrust rod carries a pressure foot at one end with a longitudinally adjustable handle and nut at the opposite end, the rod sliding in a fixed bushing and having a threaded portion to receive the nut carried upon the rod.

Another object is to provide an improved sliding rod type of pressure unit having a rapid advancing and retarding range and a screw advance and retarding range with a longitudinally adjustable nut on the rod to determine the range of operation of the unit with mechanical advantage.

A further object is to provide an improved pressure unit having a thrust rod with a pressure foot on one end and a bushing in which the rod is slidable, the external diameter of the bushing exceeding that of the foot whereby the foot may be inserted through an aperture in which the bushing is substantially fixedly received.

These and other objects and advantages of the invention will appear from the following specification and claim.

In the drawings,

Fig. I is an elevational view of a fixture embodying three similar pressure units in different positions of operation and adjustment, and Fig. II is a detail of the combination handle and nut.

One form of the invention is shown in the drawings wherein a wall 10 of a holding fixture has threaded apertures 12. The threaded bushing 14 of similar pressure units 16 are shown threaded into the apertures 12.

Each unit 16 comprises a rod 18 slidable in the bushing 14. At one end of the rod 18 is a conventional pressure foot 20 and at the opposite end a combination handle and nut 22. As more clearly shown in Fig. II, the handle and nut 22 has a knurled handle portion 24 having a smooth bore 25 to slidably receive the end of the rod 18 which has been flattened at 26, to receive the adjustable set screw 28 to hold the handle and nut 22 in positions of longitudinal adjustment along the rod 18.

Forward of the handle portion 24 is an internally threaded nut portion 30 which will threadedly receive the thereaded collar portion 32 of the bushing 14 to advance the rod 18 and foot 20 with the mechanical advantage of a screw upon rotation of the handle portion 24.

The design of the unit 16 is such that the internal diameter of the aperture in which the bushing 14 is received will permit the foot 20 to pass. This enables the unit 16 to be assembled and disassembled with respect to the wall 10 entirely from the left hand side as shown in Fig. I. Also, in lieu of the threaded wall 10, a standard jam nut may be welded to the fixture concentric with an opening therein to receive the threaded bushing 14.

The uppermost unit 16 of Fig. I is shown completely retracted. Endwise pressure upon the handle portion 24 will slide the rod 18 in the bushing 14 to the full-line position of the intermediate unit 16 of Fig. I in which position the internal threads of the portion 30 are abutting the external threads of the collar 32. Rotation of the handle portion 24 will advance the rod 18 and foot 20 into the dotted line position.

Referring to the lowermost unit 16 of Fig. I, the set screw 28 has been loosened and the combination handle and nut 22 has been slid along the rod 18 to a different position of adjustment from that of the other units 16. In this manner the range of operation of the foot 20 with respect to both rapid traverse and screw advancement has been conveniently altered.

To tension the rod 18 of the unit 16 in the retracted position, a split resilient ring 34 is carried in the groove 36. When that portion of the rod 18 carrying the ring 34 is within the bore of the bushing 14, the tension of the ring 34 against the wall of the bore will support the rod 18 against movement by gravity or vibration.

Having thus described my invention, what I wish to claim as new and novel and protect by Letters Patent is:

A pressure applying rod unit having a rapid traverse range with longitudinal sliding movement and a screw advance range with rotational movement comprising a bushing having a smooth bore and a pair of externally threaded longitudinally spaced portions concentric with said bore, a thrust rod supported in said bushing for rotational as well as longitudinal sliding movement, the pressure applying end of said rod being at one side of said bushing, a combination handle and nut longitudinally and relatively adjustable along said rod on the other side of said bushing, an internally threaded nut on said combination handle and nut concentrically embracing said rod and adapted to threadedly engage one of said externally threaded portions upon rotation of said combination handle and nut following sliding movement of said rod to bring the mating threaded portions into engagement with each other, said other threaded portion of said bushing being adapted to be received in the aperture of a fixed structure.

References Cited in the file of this patent
UNITED STATES PATENTS

| | | |
|---|---|---|
| Re. 21,623 | Bacon | Nov. 19, 1940 |
| 1,491,556 | Shaw | Apr. 22, 1924 |
| 1,575,826 | Goetz | Mar. 9, 1926 |
| 2,339,897 | Wetzler | Jan. 25, 1944 |
| 2,421,282 | Merriman | May 27, 1947 |
| 2,567,571 | Merriman | Sept. 11, 1951 |

FOREIGN PATENTS

| | | |
|---|---|---|
| 95,609 | Austria | Jan. 10, 1934 |